United States Patent
Kimmich et al.

(10) Patent No.: US 8,633,620 B2
(45) Date of Patent: Jan. 21, 2014

(54) ELECTRIC MOTOR, IN PARTICULAR ACTUATOR MOTOR OR DRIVE MOTOR IN MOTOR VEHICLES

(75) Inventors: Peter Kimmich, Schoenaich (DE); Quoc-Dat Nguyen, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 883 days.

(21) Appl. No.: 12/670,233

(22) PCT Filed: May 27, 2008

(86) PCT No.: PCT/EP2008/056480
§ 371 (c)(1),
(2), (4) Date: Jun. 22, 2010

(87) PCT Pub. No.: WO2009/013042
PCT Pub. Date: Jan. 29, 2009

(65) Prior Publication Data
US 2013/0193785 A1    Aug. 1, 2013

(30) Foreign Application Priority Data
Jul. 24, 2007    (DE) .......................... 10 2007 034 327

(51) Int. Cl.
*H02K 9/00*    (2006.01)
(52) U.S. Cl.
USPC ................... 310/52; 310/64; 310/71
(58) Field of Classification Search
USPC .......................... 310/52, 64, 71, 89
See application file for complete search history.

(56) References Cited

U.S. PATENT DOCUMENTS

| 5,712,517 A * | 1/1998 | Schmidt et al. ................. 310/45 |
| 6,091,174 A | 7/2000 | Genster |
| 6,175,171 B1 | 1/2001 | Rupp et al. |
| 6,933,638 B2 * | 8/2005 | Hirth .............................. 310/71 |
| 7,291,950 B2 * | 11/2007 | Isoda et al. ...................... 310/71 |
| 7,378,766 B2 * | 5/2008 | Vasilescu et al. ............... 310/58 |
| 7,638,910 B2 * | 12/2009 | Akita et al. ................. 310/68 D |
| 2003/0173839 A1 | 9/2003 | Torii et al. |
| 2007/0069593 A1 * | 3/2007 | Vasilescu et al. ............... 310/54 |

FOREIGN PATENT DOCUMENTS

| DE | 196 24 145 | 1/1998 |
| DE | 197 27 165 | 1/1999 |
| DE | 10 2005 059 162 | 6/2007 |
| JP | 2004159464 | 6/2004 |
| JP | 2007116840 | 5/2007 |

* cited by examiner

*Primary Examiner* — Thanh Lam
(74) *Attorney, Agent, or Firm* — Merchant & Gould P.C.

(57) ABSTRACT

An electric motor has a stator and a coil which is arranged within the stator housing and whose winding can be energized via a connection line system. A cooling plate is arranged outside the interior of the stator, and on the outer side of said cooling plate a carrier plate for motor electronics is arranged, to which carrier plate the connection line system is connected. The connection line system is led from the inside to the outside through a recess in the cooling plate and is electrically connected to the carrier plate.

14 Claims, 1 Drawing Sheet

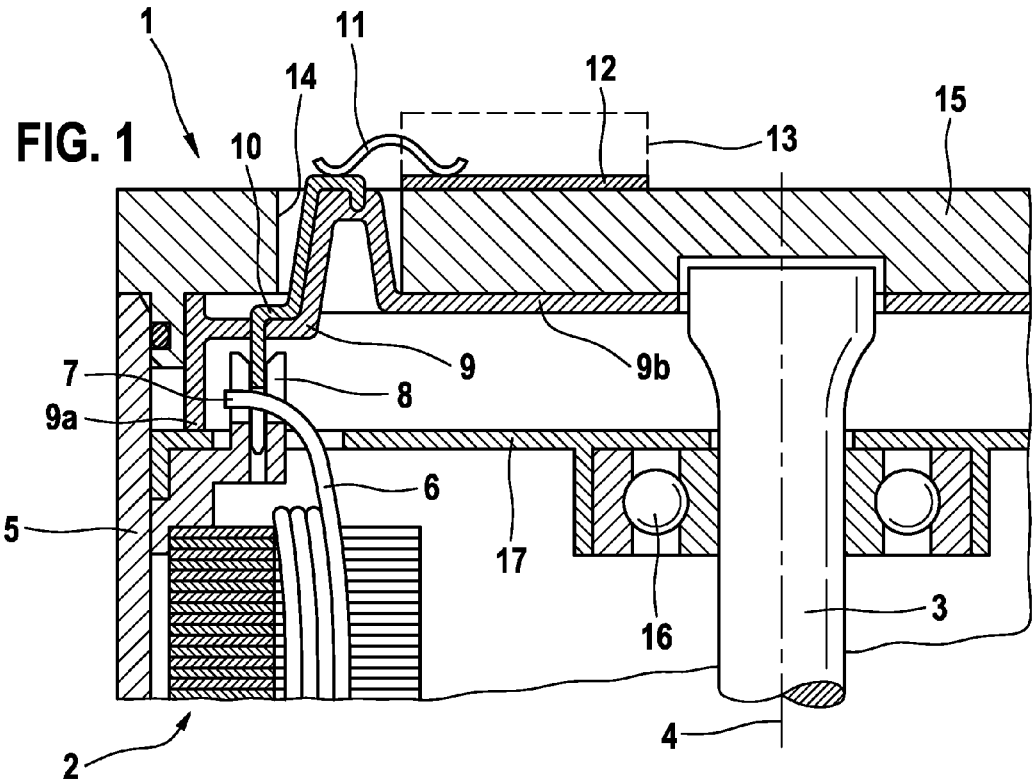
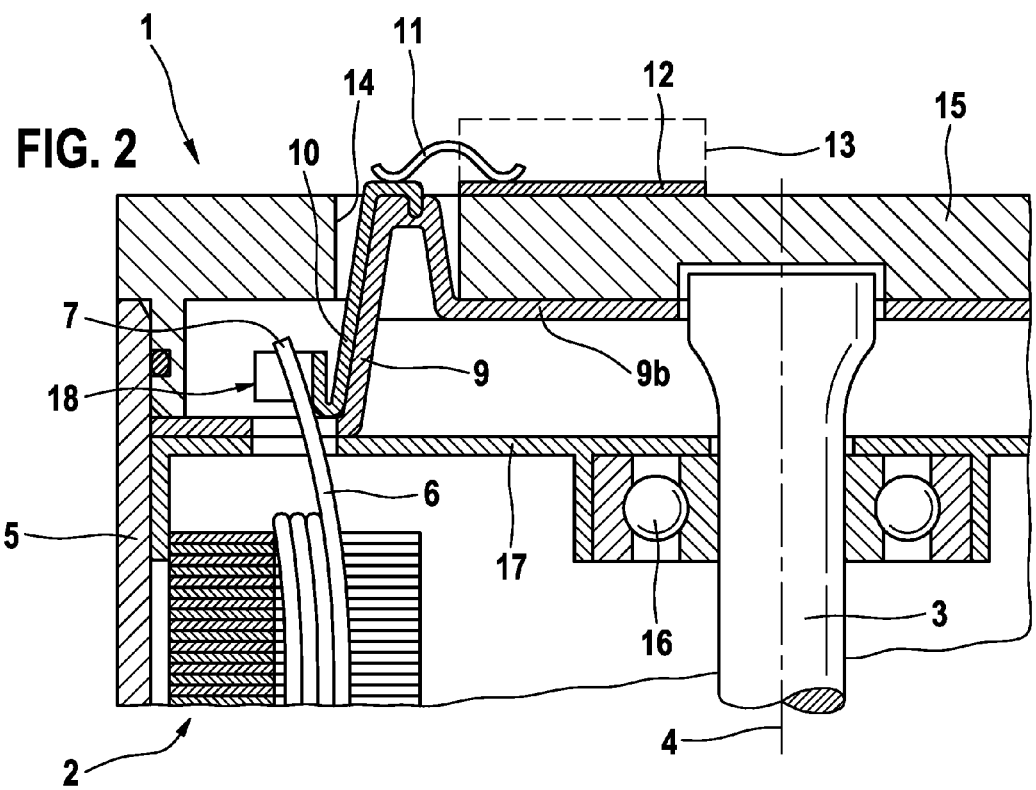

ELECTRIC MOTOR, IN PARTICULAR ACTUATOR MOTOR OR DRIVE MOTOR IN MOTOR VEHICLES

This application is a National Stage Application of PCT/EP2008/056480, filed 27 May 2008, which claims benefit of Ser. No. 10 2007 034 327.4, filed 24 Jul. 2007 in Germany and which applications are incorporated herein by reference. To the extent appropriate, a claim of priority is made to each of the above disclosed applications.

The invention relates to an electric motor, in particular an actuator motor or drive motor in motor vehicles.

SUMMARY

DE 10 2005 059 162 A1 describes an electric motor, which is construed as asynchronous or synchronous motor and which can be used for an electric servo steering in a motor vehicle. The electric motor provides a stator package with a coil in a motor housing, which is supplied with current by a phase power connection, whereby the phase power connection is led through the housing cover of the motor housing to a control unit that is arranged outside with the housing. That control unit is kept on a fixing carrier, which is arranged sideways and which spans parallel and with a distance to the outer sheath of the motor housing and which has, in additional to the carrier function, the task to divert lost heat of the motor and heat of the control unit. Therefore the fixing body that is construed as cooling plate provides high heat conductivity and a high heat capacity.

In order to connect the phase connection with the control unit a recess is arranged in the fixing carrier, into which the phase power connection reaches. In that recess, which stretches over an L-formed angle section of the fixing body, there are also power lines, which connect the phase power connection with the control unit.

BACKGROUND

Based on this state of the art the invention is based on the task to simplify the construction of an electric motor, which provides a cooling plate and a motor electronic that is arranged on the outside at the housing.

The electric motor, which is particularly arranged as asynchronous motor (ASM) or a synchronous motor (PSM), has a stator in a stator housing and a rotating rotor as well as a coil, which is arranged within the stator housing and whose winding can be energized via a connection line system. A cooling plate is arranged outside the stator interior, which serves as closure of the motor housing and on whose outside a carrier plate is located for the motor electronic, to which the connection line system is connected. According to the invention it is now provided, that the connection line system is led through a recess, which is located in the cooling plate, from the inside to the outside and electrically connected to the carrier plate of the motor electronic. That recess provides the advantage that the connection line system manages the connection between the winding within the stator housing and the carrier plate on the outside of the cooling plate as fast as possible, so that even simple and short connection line systems can be used. The simplified construction reduces also the mounting time for the electric motor and allows a better control and an easier repairing in the event of damage.

According to an advantageous improvement it is provided that the cooling plate is arranged at the front side of the motor. The cooling plate creates in this embodiment the bottom or the cover or is connected with a bottom or cover that is on the side of the housing. But basically the cooling plate can also be positioned in the area of the circumference of the electric motor.

According to a further useful embodiment the cooling plate creates a housing part, whereby an optimal heat dissipation of the heat loss of the electric motor that is created during the running operation is maintained.

According to a further useful embodiment the connection line system, in particular bus bars, which are a component of the connection line system, are held by a carrier part that is attached to the housing and which is preferably construed as electrically isolated plastic carrier. This carrier part can also be a carrier of the cooling plate besides its function to take in and hold the connection line system.

The bus bars as a component of the connection line system stick through the cooling plate and are either directly connected to the carrier plate, or, according to a further advantageous embodiment, electrically connected with the carrier plate by a bond, for example a bonding wire, which creates a connection between the part of the bus bars that sticks through the carrier plate and the carrier plate.

The connection between the bus bars and the phase power connection within the stator housing can be carried out in different ways. A contacting element, which is arranged on the side of the stator and in which the bus bars and the phase power connection are led together comes for example into question. But a connection that is created by crimping or a welding of the bus bars and phase power connection together is also possible.

The embodiment according to the invention suits especially for a use in electric motor, at which the coil is a component of the stator. In that case the connection line system, in particular the bus bars, can be directly connected to the winding. But it is basically also possible to connect the connection line system electrically via a commutator with a rotating armature on the rotor shaft.

Alternating and rotary current motor come into question as electric motors, for example permanently excited synchronous motors (PSM) or asynchronous motors (ASM). But an implementation as a direct current motor is basically also possible.

BRIEF DESCRIPTION OF THE DRAWINGS

Further advantages and useful embodiments can be taken from further clams, the description of the figures and the drawings. It is shown in:

FIG. 1 is a cut through an electric motor with a rotor that is incorporated in the stator or motor housing and a stator package, which comprises a coil that can be supplied with current and which is led through a cooling plate on the front side via a connection line system, whereby the connection line system is electrically connected to a carrier plate for the motor electronic, FIG. 2 is an electric motor in a second embodiment, at which the connection between the winding of the stator package and the connection line system is realized in a varied implementation.

DETAILED DESCRIPTION

The same components have the same reference signs in those figures.

The electric motor 1 that is shown in FIG. 1 is an asynchronous motor (ASM) or a permanently excited synchronous motor (PSM), preferably an actuator motor or a drive motor in a motor vehicle. The electric motor 1 provides a stator in the motor or stator housing 5 and a rotatable rotor that is stored inside consisting of a rotor shaft 3 and a rotor package that is not further shown in the figure. The stator comprises a stator package 2, which is mounted to the housing and which provides a coil with a coil 6 that can be supplied with electrical current and which is electrically connected with a bus bar 10 via a phase power connection 7. The connection between the phase power connection 7 and the bus bar 10 takes place in a contact element 8, which is attached to the internal wall of the stator housing 5 and which preferably provides a notch for incorporating the phase power connection 7 and/or the end segment of the bus bar 10.

The bus bar 10 is held by a carrier part, which is construed as electrically isolating plastic carrier 9 and which is permanently connected to the stator housing 5. The plastic carrier 9 is located on the inside of the stator housing 5 and reaches with one section 9a parallel to the sidewall, which runs axis-parallel to the rotor axis 4 of the rotor shaft 3, and with a further section 9b at the inside of a cooling plate 15, which is arranged at the front side of the electric motor and which can create a part of the stator or motor housing 5; the section 9b of the plastic carrier 9 carries or supports the cooling plate 15. A centered section of the plastic carrier 9 reaches through a recess 14, which is put into the cooling plate 15.

The cooling plate 15 conveniently consists of a material with high heat conductivity and a high heat capacity, in particular metal, and serves for cooling the heat loss of the electric motor that is created during the operation. The cooling plate 15 is furthermore a carrier of a control unit 13, which is arranged on a carrier plate 12 and which is also cooled by the cooling plate.

The recess 14 in the cooling plate 15 reaches completely through the wall of the cooling plate and connects the stator inside with the surroundings. The plastic carrier 9 is led through the recess 14 that runs towards the axis including the bus bar 10 that is held at the plastic carrier 9. A section of the bus bar 10 that is led through the recess 14 is electrically connected on the outside of the cooling plate 15 with the carrier plate 12 or the control unit 13 via a bonding wire 11. Thereby the electric contact or the electric supply of the winding 6 of the stator package 2 with the control unit 13 or a current supply source is created.

For storing the rotor shaft 3 a swivel 16 is provided in the stator housing 5, which is held on a carrier 17, which is mounted to the housing and spans parallel to the section 9b, which abuts at the internal wall of the cooling plate 15.

FIG. 2 shows a further embodiment for an electric motor 1, which basically corresponds with the one in FIG. 1, so that it can be referred to the above description. But in distinction from FIG. 1 the connection between the phase power connection 7 and the bus bar 10, which is led through the recess 14 in the cooling plate 15, is realized in an alternative way. The connection 18 is therefore carried out as crimp connection, at which the phase power connection 7 and the bus bar 10 are connected with each other by plastic deformation. As an alternative to the crimping connection a welding connection can also be used.

The invention claimed is:

1. An electric motor, in particular an actuator motor or a drive motor in motor vehicles, comprising:
   a stator and a rotating rotor;
   a coil that is stored within the stator housing, wherein an electric connection line system supplies the coil winding with current;
   a cooling plate arranged outside the stator interior and at the motor's exterior; and
   a carrier plate arranged on the outside of the cooling plate for the motor electronic, the carrier plate connected to the electric connection line system, wherein the electric connection line system is led through a recess in the cooling plate from the inside to the outside and electrically connected with the carrier plate.

2. The electric motor according to claim 1, wherein the cooling plate creates a housing part.

3. The electric motor according to claim 1, wherein the connection line system comprises a bus bar, which is connected within the stator housing with a phase power connection, which is electrically connected with the winding of the coil, and in that the bus bar is led through the recess in the cooling plate.

4. The electric motor according to claim 3, wherein the connection line system is held at a carrier part that is mounted to the housing.

5. The electric motor according to claim 4, wherein the carrier part is construed as electrically isolating plastic carrier.

6. The electric motor according to claim 4, wherein the carrier part is also a carrier of the cooling plate.

7. The electric motor according to claim 3, wherein the bus bar is connected to the carrier plate on the outside of the cooling plate via a bonding wire.

8. The electric motor according to claim 3, wherein the bus bar and the phase power connection are led together in a contact element that is mounted to the stator.

9. The electric motor according to claim 3, wherein the bus bar and the phase power connection are crimped together.

10. The electric motor according to claim 3, wherein the bus bar and the phase power connection are welded together.

11. The electric motor according claim 1, wherein the coil is a component of the stator.

12. The electric motor according to claim 1, wherein an embodiment as permanently excited synchronous motor (PSM).

13. The electric motor according to claim 1, wherein an embodiment as asynchronous motor (ASM).

14. The electric motor according to claim 1, wherein an embodiment as direct current motor.

* * * * *